United States Patent
Zhou

(10) Patent No.: US 9,736,186 B2
(45) Date of Patent: Aug. 15, 2017

(54) PUBLIC AND PRIVATE HYBRID DISTRIBUTED CLOUD STORAGE SYSTEM AND CLOUD STORAGE METHOD

(71) Applicant: BEIJING GUPANCHUANGSHI SCIENCE AND TECHNOLOGY DEVELOPMENT CO., LTD., Beijing (CN)

(72) Inventor: Haiyan Zhou, Beijing (CN)

(73) Assignee: BEIJING GUPANCHUANGSHI SCIENCE AND TECHNOLOGY DEVELOPMENT CO., LTD., Beijing (CN)

( * ) Notice: Subject to any disclaimer, the term of this patent is extended or adjusted under 35 U.S.C. 154(b) by 30 days.

(21) Appl. No.: 14/896,670

(22) PCT Filed: Oct. 21, 2013

(86) PCT No.: PCT/CN2013/085547
§ 371 (c)(1),
(2) Date: Dec. 8, 2015

(87) PCT Pub. No.: WO2014/194601
PCT Pub. Date: Dec. 11, 2014

(65) Prior Publication Data
US 2016/0112455 A1    Apr. 21, 2016

(30) Foreign Application Priority Data

Jun. 8, 2013    (CN) .......................... 2013 1 0228495

(51) Int. Cl.
*H04L 29/06*    (2006.01)
*H04L 29/08*    (2006.01)

(52) U.S. Cl.
CPC .............. *H04L 63/20* (2013.01); *H04L 29/08* (2013.01); *H04L 63/08* (2013.01); *H04L 63/105* (2013.01);
(Continued)

(58) Field of Classification Search
CPC ....... H04L 63/20; H04L 63/08; H04L 63/105; H04L 67/10; H04L 67/108; H04L 67/1097; H04L 29/08
See application file for complete search history.

(56) References Cited

U.S. PATENT DOCUMENTS 8,805,951 B1 *    8/2014    Faibish ................ G06F 9/5072
                                                            709/213
2010/0325422 A1    12/2010    Gnanasambandam et al.
(Continued)

FOREIGN PATENT DOCUMENTS

| CN | 102664928 A | 9/2012 |
| CN | 102882908 A | 1/2013 |
| CN | 103207971 A | 7/2013 |

OTHER PUBLICATIONS

International Search Report of PCT Patent Application No. PCT/CN2013/085547 issued on Mar. 13, 2014.
(Continued)

*Primary Examiner* — Catherine Thiaw

(57) ABSTRACT

Public and private hybrid distributed cloud storage system and cloud storage method including an application system, a segmentation aggregation system, a public storage system and a private storage system. The application system provides original complete data and initiates an access request to the segmentation aggregation system. The segmentation aggregation system divides original complete data into data fragments and distributes to said public storage system and private storage system according to a preset storage proportion and receives the fragments returned by the public and
(Continued)

private storage systems and aggregates them into the complete data, and transfers to said application system. The public storage system manages, authenticates and stores fragments. The private system manages, authenticates, counts, controls and stores fragments. The method, based on the cloud storage system, includes logging data and reading data. This invention solves problems of limited capacity private storage systems, inadequate bandwidth and security vulnerable public storage system.

9 Claims, 1 Drawing Sheet

(52) U.S. Cl.
CPC ............ *H04L 67/10* (2013.01); *H04L 67/108* (2013.01); *H04L 67/1097* (2013.01)

(56) References Cited

U.S. PATENT DOCUMENTS

| | | |
|---|---|---|
| 2011/0246766 A1 | 10/2011 | Orsini et al. |
| 2012/0047339 A1* | 2/2012 | Decasper ............ G06F 11/1076 711/162 |
| 2012/0136960 A1 | 5/2012 | Liu |
| 2013/0110778 A1* | 5/2013 | Taylor ............... G06F 17/30215 707/624 |
| 2013/0117337 A1 | 5/2013 | Dunham |
| 2013/0185569 A1* | 7/2013 | Xu ..................... G06F 21/6209 713/189 |
| 2013/0208893 A1* | 8/2013 | Shablygin ............ H04L 9/0822 380/277 |
| 2014/0244937 A1* | 8/2014 | Bloomstein ....... H04L 29/08801 711/136 |
| 2014/0310321 A1* | 10/2014 | Murata .............. H04N 21/2312 707/812 |
| 2014/0337961 A1* | 11/2014 | Chien .................... H04L 63/10 726/12 |
| 2016/0110262 A1* | 4/2016 | Nanivadekar ....... G06F 11/1469 707/654 |

OTHER PUBLICATIONS

Liwei Wang, A Users' Core Data Protection Model Based on Cloud Computing, J. Wuhan Univ. (Nat. Sci. Ed.), Apr. 2013, pp. 165-170, vol. 59, No. 2.

Search Report of counterpart European Patent Application No. 13886349.3 issued on Apr. 22, 2016.

* cited by examiner

PUBLIC AND PRIVATE HYBRID DISTRIBUTED CLOUD STORAGE SYSTEM AND CLOUD STORAGE METHOD

TECHNICAL FIELD

The invention relates to the field of cloud technology, particularly involving a public-private hybrid distributed cloud storage system and a cloud storage method.

BACKGROUND ART

With the continuous development of Internet technology, currently, products based on a variety of cloud architectures emerge in endlessly. Cloud technologies are divided into private cloud technology and public cloud technology in structure, wherein the private cloud is secure, but not easy for being large-scale called, while the public cloud has less security actually and psychologically, but has computing resources, storage resources and broadband resources relatively much better. Therefore, many users are facing the dilemma that they want to put their data into the public network, but worry about security issues. For example, current data of video, audio, text, databases and the like are mostly private data of an individual or a public institution, so if the data is exclusively put in one provider, regardless of how good the encryption of the provider is, users still consider the data out of their control, causing psychological insecurity. The current global primary technologies use their own means of encryption to encrypt and protect the users' data and separately store them in their own systems.

The encryption provided by the service provider has the following drawbacks: users cannot actually feel that they own the actual data; the users cannot use some means to control the access to the data; users cannot get some means to monitor the access to the data; when the data migrates within a same institution or between different agencies, it cannot ensure that the complete data is not copied or stolen.

In addition, when desiring data migration for replacement of the service provider, users may have a misgiving due to the impression that the original service provider may remain a set of backup copy in the system, so the current cloud storage model fails to solve the user's psychological and practical security issues in terms of actual supervision, control and manage.

SUMMARY OF THE INVENTION

The technical problem solved by the invention is providing a public-private hybrid distributed storage system and a cloud storage method for solving the problems existing in the prior art that a private system is not facilitated for sharing and publication of a large amount of data, and a public system is not of security.

The present invention solves the above problems by the technical solution as follows: a public-private hybrid distributed cloud storage system includes an application system, a segmentation aggregation system, a public storage system, and a private storage system.

Said application system is connected with said segmentation aggregation system, for providing the original complete data to said segmentation aggregation system, and initiating an access request and provide user registration information to the public storage system or the private storage system via the segmentation aggregation system, and it is also connected to said private storage system, for controlling said private storage system.

Said segmentation aggregation system is connected to said public storage system and private storage system, for dividing the original complete data into a number of data fragments, and distributing said data fragments to said public storage system and private storage system according to a preset storage proportion; and is connected with said application system, for receiving the data fragments returned by said public storage system and said private storage system according an access request initiated by said application system, then aggregating said data fragments returned by said public storage system and said private storage system into complete data, and transferring again the aggregated complete data to said application system.

Said public storage system is used for management, authentication and storage of the data fragments transferred by said segmentation aggregation system.

Said private storage system is used for management, authentication, statistics, control and storage of the data fragments transmitted by said segmentation aggregation system.

Based on the above technical solution, the invention can be improved as follows.

Further, said segmentation aggregation system is provided with a distribution table module, which is used to record critical distribution information, wherein said critical distribution information includes a distribution pattern, a distribution address and a data combination rule.

Further, the segmentation aggregation system is an independent system or integrated into a terminal.

Further, said cloud storage system includes therein one or more public storage systems, and each of the public storage systems contains several storage units distributed in different regions.

Further, the public storage system includes a data fragment management module, a data fragment authentication module and a data fragment storage module.

Said data fragment management module is used to synchronize the user registration information to said data fragment authentication module, and automatically allocate management right, storage right and calling right of the data fragments, according to the user registration information.

Said data fragment authentication module is used to execute authentication on the user versus the public storage system.

Said data fragment storage module is used to store data fragments.

Further, the private storage system includes a data fragment management module, a data fragment authentication module, a data fragment storage module, a data fragment control module and a data fragment statistics module.

Said data fragment management module is used to synchronize the user registration information to said data fragment authentication module, and automatically allocate management right, storage right and calling right of the data fragments, according to the user registration information.

Said data fragment authentication module is used to execute authentication on the user versus the private storage system.

Said data fragment storage module is used to store data fragments.

Said data fragment control module is used to feed back accessing information to a data owner, and after obtaining verification by the data owner, control a data reading progress in a way of responding to the data visitor.

Said data fragment statistics module is used to count data accessing records.

Based on the above cloud storage structure, the technical solution of the present invention also provides a public-private hybrid distributed cloud storage method, which includes a step of logging (loading) data and a step of reading data.

The step of logging data includes:

Step A1, the application system provides the original complete data to the segmentation aggregation system;

Step A2, the segmentation aggregation system divides the original complete data into a number of data fragments and enciphers them, and then distributes said data fragments to the public storage system and the private storage system according to the preset storage proportion, and meanwhile records the critical distribution information in said segmentation aggregation system;

Step A3, said public storage system manages, authenticates and stores said data fragments transferred by said segmentation aggregation system, and said private storage system manages, authenticates, stores, controls and counts the data fragments transferred by said segmentation aggregation system.

Said step of reading data includes:

Step B1, the application system initiates an access request to the segmentation aggregation system, to inquire the critical distribution information;

Step B2, the segmentation aggregation system receives the data fragments returned by the public storage system and the private storage system according to the critical distribution information, and then deciphers the data fragments and aggregates them into a complete document;

Step B3, said segmentation aggregation system transfers the aggregated complete document to said application system.

Further, the storage proportion in said Step A2 is randomly set by the application system according to usage scenarios and/or usage demands of the user.

Further, in Step A3, that the public storage system manages, authenticates and stores said data fragments transferred by said segmentation aggregation system includes: storing data fragments and synchronizing the user registration information to data fragment authentication module of the public storage structure, executing the authentication on the user versus the public storage system, and then automatically assigning the management right, the storage right and the calling right of the public storage system based on the user registration information.

Further, in step A3, that said private storage system manages, authenticates, stores, controls and counts the data fragments transferred by said segmentation aggregation system includes: storing data fragments and synchronizing the user registration information to the data fragment authentication module of the private storage structure, executing the authentication on user versus the private storage system, and then automatically assigning the management right, the storage right and the calling right of the public storage system according to the user registration information, and under the circumstance that the user has passed authentication, it feeds back the accessing information to the data owner via the private storage system; and after obtaining verification by the data owner, controls the data reading progress in a way of responding to the data visitor, and can count data accessing records at any time.

Further, the critical distribution information in said Step A2 and said Step B1 includes a distribution pattern, a distribution address, and a data combination rule.

Further, both of the logging data step and the reading data step also include the control of the application system on the private storage system, including: when a user requests an access to data from the application system, the private storage system sends inquiry information to the data owner; after the data owner confirms that the information of the initiating user is accurate, the inquiry information of the private storage system is responded, therefore the application system achieves the data access and the modification request to the private storage system; and the application systems also can manage the name, authentication information, address, requesting method of the user and/or data content, through accessing conditions preset in the private storage system.

Further, when there are two or more application systems performing the logging-data step or the reading-data step, the application systems negotiate with each other an access mechanism by means of an offline negotiation or transmitting a distribution table which contains the public storage systems or the private storage structures being jointly connected, so as to ensure all the application systems are jointly connected to a precise storage structure.

The beneficial effects of the invention are: the present invention, primarily aiming to users using a cloud storage system, divides the complete data into a certain number of parts by using the segmentation aggregation system, with some data placed in the private storage system and the other (or multiple parts) in other public storage system, and performs the control and statistics on the accessed address, user, time and so on, through access to the private storage system, so as to effectively protect the ownership, supervision and control rights of the user. Specifically, the technical solution of the present invention solves the problems that the private system has small capacity and deficient bandwidth, as well as the public system is vulnerable in security, and it not only prevents the losing and tampering of data, as well as unauthorized access, but also ensures well sharing and publication. It adopts two or more sets of user names and passwords, allowing to be migrated freely between multiple systems, so that the data is not apt to be stolen by hackers, and also effectively avoiding the data from being arbitrarily copied.

Reference numbers in the figures are illustrated as follows:

1. Application system; 2. Segmentation aggregation system; 3. Public storage system; 4. Private storage system.

DETAILED DESCRIPTION OF EMBODIMENTS

Hereinafter, principles and characteristics of the present invention are described in conjunction with the figures, wherein the given examples are only used to illustrate the present invention, other than limit the scope of protection of the present invention.

Figure 1:
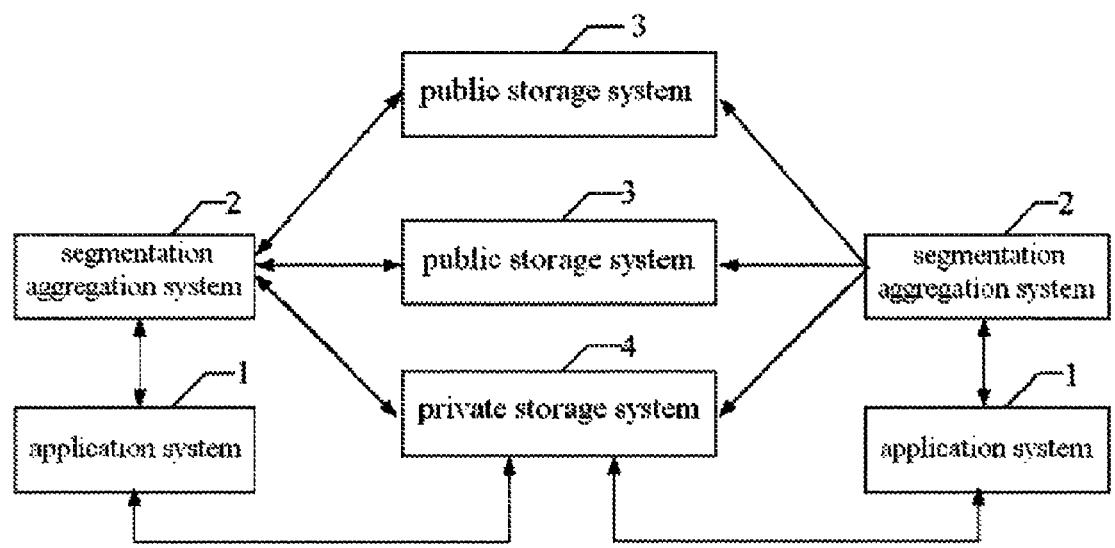
FIG. 1 is a schematic diagram of the cloud storage system according to the present invention.

As shown in FIG. 1, the present embodiment provides a public-private hybrid distributed cloud storage system, including an application system 1, a segmentation aggregation system 2, a public storage system 3, and a private storage system 4.

Said application system 1 is connected with said segmentation aggregation system 2, for providing the original complete data to said segmentation aggregation system 3, and initiating an access request and provide the user registration information to the public storage system or the private storage system via the segmentation aggregation system 3, and is also connected to said private storage system 4, for controlling said private storage system 4.

Said segmentation aggregation system 2 is connected to said public storage system 3 and the private storage system 4, for dividing the original complete data into a number of data fragments, and distributing said data fragments to said public storage system 3 and private storage system 4, according to a preset storage proportion, and it is connected with said application system 1, for receiving the data fragments returned by said public storage system 3 and said private storage system 4 according an access request initiated by said application system 1, then aggregating said data fragments returned by said public storage system 3 and said private storage system 4 into the complete data, and transferring again the aggregated complete data to said application system.

Said public storage system 3 is used for management, authentication and storage of the data fragments transmitted by said segmentation aggregation system.

Said private storage system 4 is used for management, authentication, statistics, control and storage of the data fragment transmitted by said segmentation aggregation system.

In the present embodiment, said application system is operated by the user, that is, the user can have access to data via said application system, wherein the user can also be a client end which is independent from the application system, and wherein said segmentation aggregation system 2 is provided with a distribution table module, which is used to record critical distribution information, and said critical distribution information includes a distribution pattern, a distribution address and a data combination rule.

said public storage system 3 includes a data fragment management module, a data fragment authentication module and a data fragments storage module.

Said data fragment management module is used to synchronize the user registration information to said data fragment authentication module, and automatically allocate the management right, storage right and calling right of the data, fragments according to the user registration information;

Said data fragment authentication module is used to execute authentication on the user versus the public storage system.

Said data fragments storage module is used to store data fragments.

Said private storage system 4 also includes a data fragment control module and a data fragments statistics module, besides the data fragment management module, the data fragment authentication module and the data fragments storage module.

Said data fragment control module is used to feed back the accessing information to the data owner, and after obtaining verification from the data owner, control the data reading progress in a way of responding to the data visitor.

Said data fragment statistics module is used to count data accessing records.

In said private storage system, the functions of said data fragment management module, the data fragment authentication module and the data fragment storage module are consistent with those of the corresponding modules in said public storage system.

In the specific application, said segmentation aggregation system is designed as a system which has the cache function only but no storage function, capable of being used as an independent system or used by being integrated to a terminal. While the number of said public storage system(s) is one or more, and said public storage system may include several storage units distributed in different regions, which can ensure the available complete data not to be copied or stolen when the data are transmitted in a same system or between different systems. Said private storage system can be either a hardware system which is placed in a private sector of the user, or another dependable agency which is independent from the already selected public storage system, wherein said hardware system or the dependable agency will allocate more authority to the user when the user registers with the hardware system in the private sector or the dependable agency.

The implementation method which corresponds to the above cloud storage structure includes a step of logging data and a step of reading data.

Said step of logging data includes:

Step A1, wherein the application system provides original complete data to the segmentation aggregation system;

Step A2, wherein the segmentation aggregation system divides the original complete data into a number of data fragments and enciphers them, and then distributes said data fragments to the public storage system and the private storage system according to the preset storage proportion, and meanwhile records the critical distribution information in said segmentation aggregation system;

Step A3, wherein said public storage system manages, authenticates and stores said data fragments transferred by said segmentation aggregation system, and wherein said private storage system manages, authenticates, stores, controls and counts the data fragments transferred by said segmentation aggregation system.

Said step of reading data includes:

Step B1, wherein the application system initiates an access request to the segmentation aggregation system, and queries the critical distribution information;

Step B2, wherein the segmentation aggregation system receives the data fragments returned by the public storage system and the private storage system according to the critical distribution information, and then deciphers the data fragments and aggregates them into a complete document; and Step B3, wherein said segmentation aggregation system transfers the aggregated complete document to said application system.

The storage proportion in said Step A2 is randomly set by the application system according to using scenarios and/or using demands of the user. In addition, after the segmentation aggregation system in Step A2 has divided the original complete data into a number of data fragments, the system further enciphers the divided data fragments. Therefore, the segmentation aggregation system in Step B2 needs to decipher the data fragments, when aggregating the data fragments returned by the public storage system and the private storage system into the complete data.

In step A3, that the public storage system manages, authenticates and stores said data fragments transferred by said segmentation aggregation system, includes: Storing the data fragments and synchronizing the user registration information to the data fragment authentication module of the public storage structure; executing the authentication on the user versus the public storage system, and then automatically assigning the management right, storage right and calling right of the public storage system based on the user registration information.

In step A3, that said private storage system manages, authenticates, stores, controls and counts the data fragments transferred by said segmentation aggregation system includes: storing data fragments and synchronizing the user registration information to the data fragment authentication module of the private storage structure; executing authentication on the user versus the private storage system, and then automatically assigning the management right, storage right and call right of the public storage system according to the user registration information, and under the circumstance that the user has passed the authentication, it feeds back the data accessing information to the data owner via the private storage system; and after the verification by the data owner, it controls the data reading progress in a way of responding to the data visitor, and can count data accessing records at any time.

Furthermore, when the segmentation aggregation system in Step A2 distributes said data fragments to said public storage system and said private storage system, and when the segmentation aggregation system in Step B2 receives the data fragments returned by said public storage system and said private storage system, it is both needed that said public storage system and said private storage system perform the authentication, and the data fragments are sent or returned only after the authentication process has been finished.

In addition, the critical distribution information involved in said Step A2 and said Step B1 includes a distribution pattern, a distribution address and a data combination rule, which are recorded in a distribution table module provided in said segmentation aggregation system, that is, they are present in the form of a table. Through the table containing the critical distribution information, one can know the data thoroughly, but individual storing agencies have no way to know the combination rule of the data, and therefore, even obtaining all the data, they cannot combine them into the effective complete data which may be useful.

In the present embodiment, the logging-data step and said reading-data step both have the control of said application system on said private storage system, which can ensure controllability and manageability on the data access, which is carried out by the specific process in which: when there is a data access request to the application system, whether the request is from other users or from an actual data owner who registers with the private storage system, the private storage system will send an inquiry to the control terminal of the data owner, wherein the inquiry information includes the name of the user who initiates the request, the user's address, the content of the data to be accessed, and so on, wherein when the data owner confirms the originating-user information is accurate, by replying to the inquiry information sent by the private storage system, the application system can formally respond to the request for accessing and modifying the data from the initiating user, so as to realize the controllability to the private storage system. In addition, the registered user can manage the information such as user's name, authentication information, address, requesting mode, and data content by presetting access conditions in the private storage system, so as to realize manageability of the private storage system.

When there are two or more application systems performing the steps of logging data or reading data, the involved application systems negotiate an access mechanism by means of an offline negotiation or transmitting a distribution table which contains the public storage system or the private storage structure jointly connected thereto, so as to ensure all the application systems are jointly connected to the precise storage agency, which will be set forth below in reference to FIG. 2.

Figure 2:
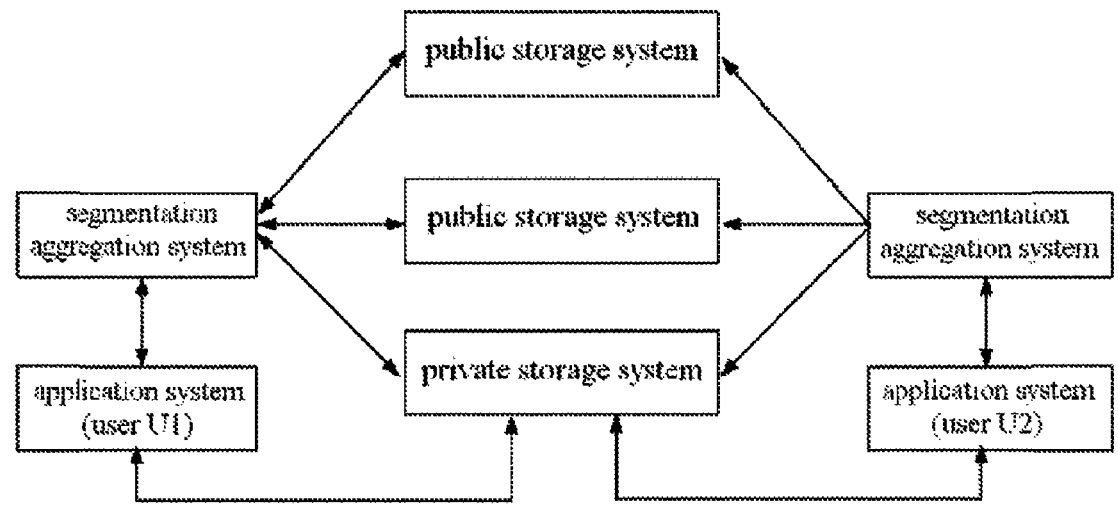
FIG. 2 is an application exemplary view of the cloud storage system according to the embodiment of the present invention.

As indicated in FIG. 2, in the present embodiment, there may be multiple application systems corresponding to multiple users. Supposing a User U1 is logging (loading) data into a cloud storage system, and then a User U2 can also have access to the private storage system and the public storage system to acquire the complete data by the above steps and methods, using correct verification information, so that privacy during the transmitting and logging process is ensured. Users U1 and U2 can negotiate the access mechanism by an offline negotiation or by transmitting the distribution table which contains both public and private storage agencies, so as to ensure that they are jointly connected to the precise storage agencies or storage systems, and to ensure more privacy of data access and transmission between them when a mutual communication linkage is established therebetween. In addition, User U1 can also affirm, by directly accessing the private storage system, whether or not the data matches the actual access of U1 and U2, so as to confirm whether or not the data is read and used in the non-authorization.

The above are preferred embodiments of the present invention, however, not intended to limit the scope of the present invention. Without departing from the spirit and scope of the present invention, any modification, equivalent replacement or further improvement should be within the protection scope of the present invention.

What is claimed is:

1. A public-private hybrid distributed cloud storage system, comprising:
an application system,
a segmentation aggregation system,
a public storage system and a private storage system implemented in hardware, wherein
said application system is connected with said segmentation aggregation system, providing original complete data to said segmentation aggregation system, initiating an access request and providing user registration information to the public storage system or the private storage system through the segmentation aggregation system; and also connected to said private storage system, controlling said private storage system;
said segmentation aggregation system is connected to said public storage system and said private storage system, dividing the original complete data into a number of data fragments, and distributing said data fragments to said public storage system and said private storage system according to a preset storage proportion; and connected with said application system, receiving the data fragments returned by said public storage system and said private storage system according the access request initiated by said application system, and then aggregating said data fragments returned by said public storage system and said private storage system into the complete data, and transferring the aggregated complete data to said application system;
said public storage system is configured for managing, authenticating and storing the data fragments transmitted by said segmentation aggregation system; and
said private storage system is configured for managing, authenticating, storing, controlling and counting the data fragments transmitted by said segmentation aggregation system;
wherein the public-private hybrid distributed cloud storage system comprises at least an additional application system, when logging data or reading data, the application system and the additional application system negotiate with each other an access mechanism by means of an offline negotiation or transmitting a distribution table containing the public storage system and the private storage system jointly connected, so as to ensure all the application systems are jointly connected into a storage agency.

2. The public-private hybrid distributed cloud storage system according to claim 1, wherein said segmentation aggregation system is provided with a distribution table, which is configured to record critical distribution information, wherein said critical distribution information includes a distribution pattern, a distribution address and a data combination rule.

3. The public-private hybrid distributed cloud storage system according to claim 1, wherein said public-private hybrid distributed cloud storage system includes one or more public storage systems, and each public storage system includes several storage units distributed in different regions.

4. The public-private hybrid distributed cloud storage system according to claim 1, wherein
said public storage system is configured to synchronize user registration information to a data fragment authentication module, and automatically allocate management right, storage right and calling right of the data fragments, according to the user registration information;
execute authentication on the user versus the public storage system; and
store the data fragments.

5. The public-private hybrid distributed cloud storage system according to claim 1, wherein
said private storage system is configured to synchronize user registration information to a data fragment authentication module, and automatically allocate management right, storage right and calling right of the data fragments, according to the user registration information;
execute authentication on the user versus the private storage system;
store the data fragments;
feed back accessing information to a data owner, and after obtaining verification from the data owner, control data reading progress in a way of responding to a data visitor; and
count data accessing records.

6. A cloud storage method for a public-private hybrid distributed cloud storage system including an application system, a segmentation aggregation system, a public storage system and a private storage system, the method comprising:
providing, by said application system connected with said segmentation aggregation system, original complete data to said segmentation aggregation system;
initiating an access request and providing user registration information to the public storage system or the private storage system through the segmentation aggregation system connected to said private storage system, and controlling said private storage system;
dividing, by said segmentation aggregation system connected to said public storage system and said private storage system implemented in hardware, the original complete data into a number of data fragments,
distributing said data fragments to said public storage system and said private storage system according to a preset storage proportion; said segmentation aggregation system connected with said application system, receiving the data fragments returned by said public storage system and said private storage system according the access request initiated by said application system, then aggregating said data fragments returned by said public storage system and said private storage system into the complete data, and transferring the aggregated complete data to said application system;
managing, authenticating and storing the data fragments transmitted by said segmentation aggregation system by public storage system; and
managing, authenticating, storing, controlling and counting by said private storage system, the data fragments transmitted by said segmentation aggregation system, the method including a step of logging data and a step of reading data, wherein
the step of logging data includes:
providing by the application system the original complete data to the segmentation aggregation system;
dividing by the segmentation aggregation system the original complete data into data fragments, enciphering the data fragments, and then distributing said data fragments to the public storage system and the private storage system according to a preset storage proportion, and while recording critical distribution information in said segmentation aggregation system;
managing, authenticating and storing by said public storage system said data fragments distributed by said segmentation aggregation system, and managing, authenticating, storing, controlling and counting by said private storage system the data fragments distributed by said segmentation aggregation system;
said step of reading data includes:
initiating by the application system an access request to the segmentation aggregation system, to query the critical distribution information;
receiving by the segmentation aggregation system the data fragments returned by the public storage system and the private storage system according to the critical distribution information, then deciphering the data fragments and aggregating the data fragments into a complete document; and
transferring by said segmentation aggregation system the aggregated complete document to said application system;
wherein said public-private hybrid distributed cloud storage system comprises at least an additional application system, when the application system and the additional application system perform the steps of logging data or reading data, the application system and the additional application system negotiate with each other an access mechanism by means of an offline negotiation or transmit a distribution table containing the public storage system and the private storage system jointly connected, so as to ensure all the application systems are jointly connected into a storage agency.

7. The cloud storage method according to claim 6, wherein the preset storage proportion is randomly set by the application system according to a using scenario and/or using demands of the user.

8. The cloud storage method according to claim 6, wherein managing, authenticating, storing, controlling and counting by said private storage system the data fragments distributed by said segmentation aggregation system further includes:

storing data fragments and synchronizing the user registration information to a data fragment authentication module of the private storage structure, executing authentication on a user versus the private storage system, and then automatically assigning management right, storage right and calling right of the public storage system according to the user registration information, and under the circumstance that the user has passed the authentication, feeding back accessing information to the a data owner through the private storage system; and after obtaining verification from the data owner, controlling data reading progress in a way of responding to the a data visitor, and being able of counting data accessing records at any time.

9. The cloud storage method according to claim 6, wherein the critical distribution information includes a distribution pattern, a distribution address, and a data combination rule.

* * * * *